April 1, 1941.   E. K. BENEDEK   2,236,666
FLUID PRESSURE POWER PUMP OR MOTOR
Filed Feb. 26, 1936   3 Sheets-Sheet 3

Inventor
Elek K Benedek
his Attorney

Patented Apr. 1, 1941

2,236,666

UNITED STATES PATENT OFFICE 2,236,666

FLUID PRESSURE POWER PUMP OR MOTOR

Elek K. Benedek, Bucyrus, Ohio

Application February 26, 1936, Serial No. 65,871

4 Claims. (Cl. 103—161)

This invention relates to high pressure, rotary, radial piston hydraulic pumps or motors for large power output.

One of the principal objects is to provide a pump or motor capable of operating efficiently at higher pressures and higher speeds than have heretofore been obtainable in structures of this general character.

The present structure is particularly useful in connection with power transmissions for marine vessels in which tremendous horsepower must be transmitted at considerable reductions in speed between the prime mover and the point of application of the power. For example, in the most recent screw propelled ships, the power plant can provide effectively as high as 160,000 horsepower. Attempts have been made to transmit such power by hydraulic or mechanical transmitting means. The hydraulic means, known as the "Foettinger" transformer and coupling being one of the better structures thus far provided. However, even the best thus far provided will not operate for speed ratios of 1:40 and 1:50 with any degree of efficiency at the power required. Obviously with 160,000 effective horsepower, even a very small loss in efficiency amounts to a continuous loss of horsepower which becomes a considerable item of expense during long periods of continuous operation. Most of the losses thus occasioned result from the inability to provide appropriate hydraulic transmission means capable of converting the primary power to useful secondary or working power with the degree of efficiency required, throughout the speed ranges and capacity necessary. Obviously, at low speed, the hydro-motor is subjected to unbelievably high torque stresses.

One of the principal objects of the present invention is to provide an efficient hydraulic pump or motor of this character which is not limited in design to size and capacity but can be made as large as necessary to meet such severe commercial needs without limitations as to the amount of efficient power output.

Another object is to provide new and improved torque transmitters for effecting torque transmission between the rotors whereby each torque transmitter exerts and transmits its proportional part of the total torque required.

Another object is to combine the advantages of radial head and T-head load and torque transmission while providing for uniformly distributed and directly applied load and reactance.

Another object is to provide an improved bearing and load coupling means in combination with the torque transmitters capable of withstanding and of operating efficiently at the large power output required of the units.

Other objects and advantages will become apparent from the following specification wherein reference is made to the drawings in which Fig. 1 is a longitudinal sectional view of a pump or motor embodying the principles of the present invention;

Figure 1:
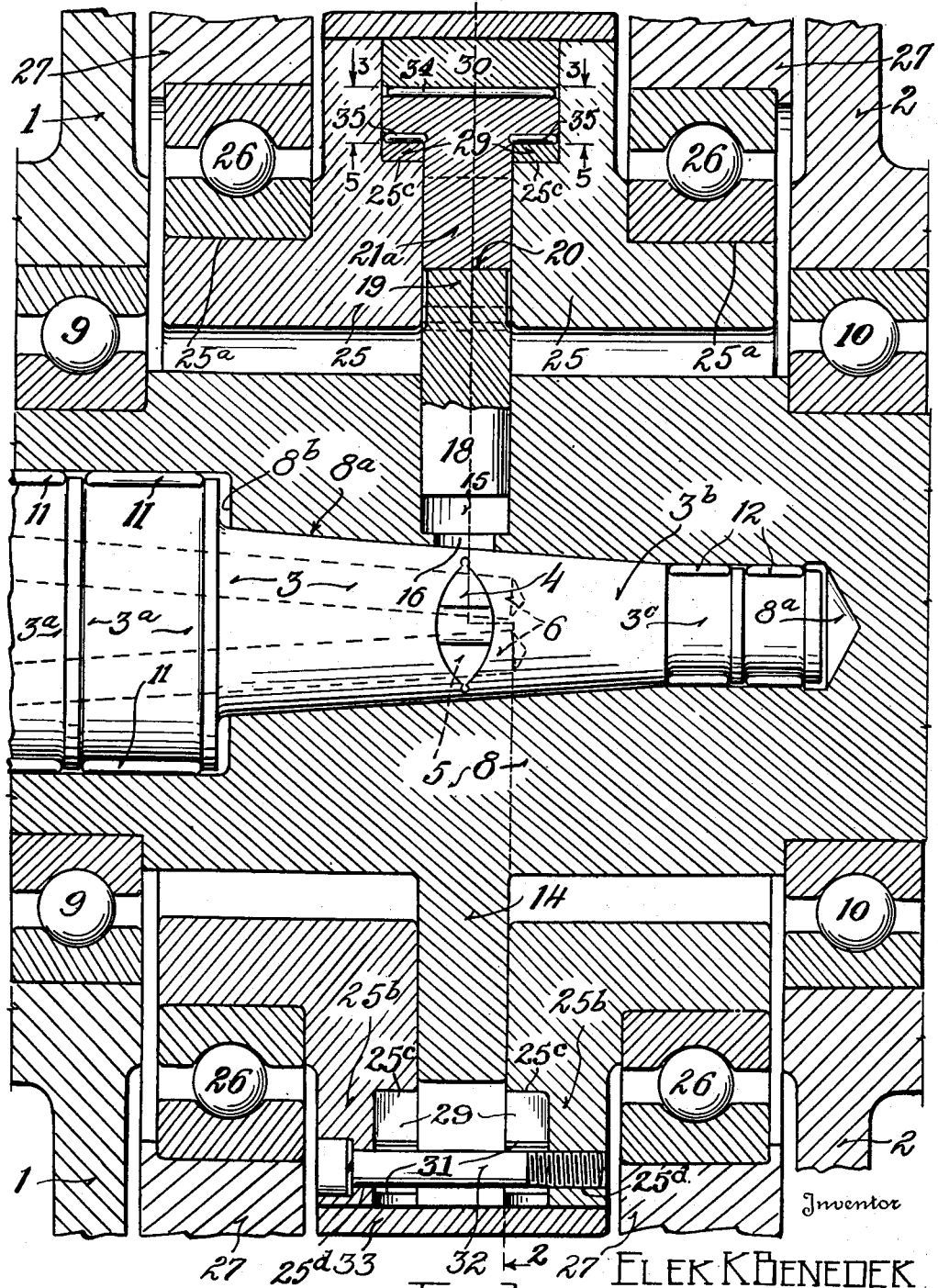

Referring to the drawings, the pump comprises an annular rigid load supporting housing, partially shown, closed at one end by an end wall I and the opposite end by an end cover 2 secured to the housing. Mounted by one end in the housing is a valve pintle 3 having an enlarged shank portion which is shrink fitted into a suitable bore of the housing end wall for supporting the pintle in coaxial position within the housing. A portion of the shank portion of the pintle is provided with circumferential recesses which provide axially spaced races 3a for sets of elongated full complement rollers, later to be described. Beyond the race portions 3a, the pintle has a valve portion 3b which is tapered from adjacent the race 3a toward the opposite end of the pintle. The opposite end of the pintle has parallel axially spaced recesses forming inner parallel races 3c for full complement rollers, later to be described. In the tapered valve portion 3b of the pintle are a pair of diametrically opposite internal ports 4 and 5 which are separated by suitable bridges, as better illustrated in Fig. 2.

The pintle 3 is provided with longitudinal ducts 6 and 7 respectively which communicate with the ports 4 and 5 respectively and, in turn, communicate with external pressure ports, not shown, in the shank portion of the pintle. The external pressure ports, in turn, are connected to the external fluid circuit in the usual manner.

Anti-frictionally mounted within the housing is a cylinder barrel 8 having an axial valve bore 8a. For rotatably supporting the barrel, the barrel is provided at its ends with reduced diameter hub portions which fixedly accommodate the inner races of heavy duty sets of roller bearings 9 and 10 respectively. The bearings 9 and 10, in turn, operate in complementary outer races respectively in the walls 1 and 2 respectively of the housing, thus supporting the barrel in accurate axial position. Due to the heavy loads to be carried and the axial thrust imposed, the bearings 9 and 10 are combination radial load and axial thrust bearings.

The barrel and pintle are maintained in coaxial relation regardless of manufacturing inaccuracies or adjustments by means of sets of elongated rollers 11 interposed between the recesses 3a on the one hand and radially aligned race portions in the barrel counterbore. Correspondingly, sets of elongated rollers 12 are operatively interposed between the recesses 3c and radially aligned race surfaces in the barrel bore 8a. Axial displacement of the rollers is prevented by the end walls of the recesses 3a and 3c. The axial bore 8a of the barrel 8 is tapered correspondingly to the portion 3b of the pintle and fits the pintle with slight but positive radial clearance, this clearance being maintained under all conditions by the sets of elongated rollers 11 and 12. The rollers of each set are positively spaced from each other circumferentially a capillary distance only, so that they are guided by oil films between the rollers. Each set of rollers 11 and 12 is of capillary length and a plurality of sets are used at each end in preference to single longer rollers so that this capillary length of each set can be maintained and skewing and wear eliminated. By "capillary" length I mean such length, as compared to the diameter of the individual rollers, that the spaces between adjacent rollers will, in effect, constitute capillary tubes into which oil is drawn by capillary attraction. In general, if the ratio of length to diameter is greater than 5 but less than 10, the spaces will have capillary characteristics. Due to the tremendous pressures to be carried and the high rotative speed, the pintle is hydrostatically balanced, as more fully set forth in my co-pending application, Ser. No. 753,873, filed November 26, 1934. The barrel 8 has a radial torque element or torque flange 14 and a plurality of radial cylinders 15, each having a cylinder port 16 for effecting valving cooperation with the pintle ports 4 and 5 respectively consequent upon rotation of the barrel. The cylinders 15 are shown for purposes of illustration only as located in the zone of the flange 14. The flange 14, in turn, has a series of radial guideways 17 which are aligned respectively with the cylinders 15, the guideways 17 having cylindrical end or guide walls, as better illustrated in Fig. 5, for purposes later to be described. Mounted in the cylinders are pistons 18 respectively, each piston having a head 19, the head 19 having a convex load surface 20. Efficient synchronized rotation of the barrel and reactance must be effected independently of the pistons and cylinders, and for this purpose torque transmitters 21 are provided. In the present structure, the torque transmitters perform both torque transmission and load application, the former being independently of the latter. Here it should be noted that the greater the power to be provided by the pump or motor, the more rugged and larger must be the torque transmitters. High fluid pressures, however, require smaller pistons than are required for the same volume of fluid at lower pressures. Thus as pressure and torque increase, the torque transmitters increase in size relative to the pistons.

As the pistons thus become relatively smaller, accuracy in load application must be provided. Relatively smaller pistons, however, may be readily accommodated in the same zone as the torque transmitters. Consequently, in the present structure, the torque transmitters perform the secondary function of actuating the pistons, and the flange 14, in the zone of the pistons, is utilized as the cooperating torque member of the barrel. Thus, the torque transmitters 21 are also an actuating means for the pistons in this illustrative embodiment of the invention, and in performing this secondary function, become, in operative effect, different elements from torque transmitters and are so recited broadly in part of the claims.

Figure 2:
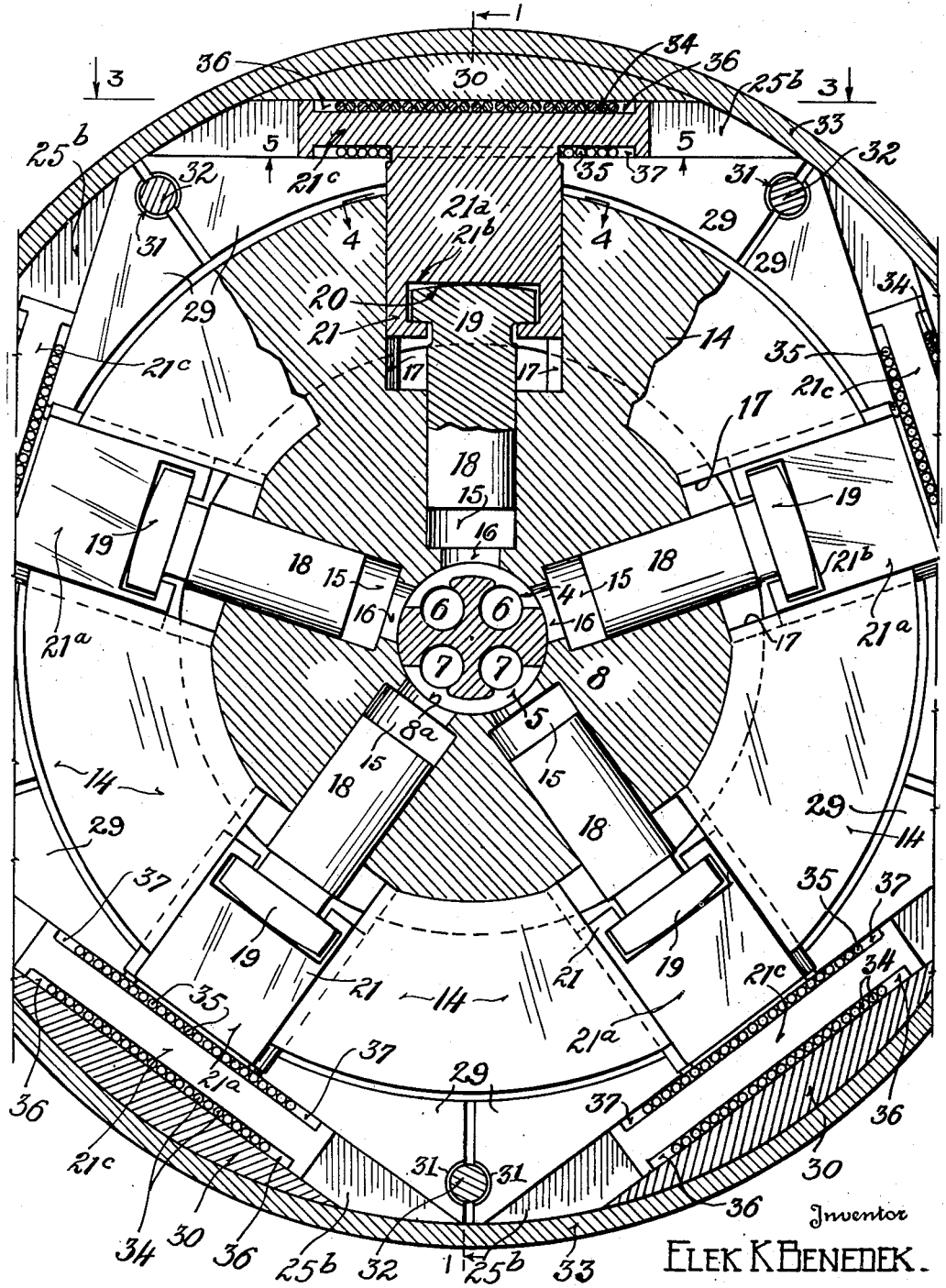
Fig. 2 is a cross sectional view taken through the plane of the pistons and barrel flange in Fig. 1, part thereof being shown in elevation for clearness in illustration.
Figure 4:
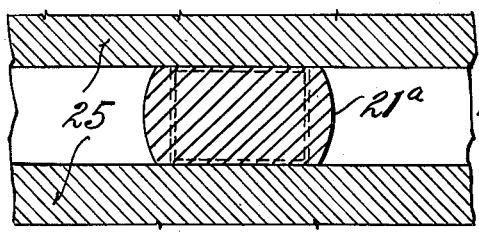
Fig. 4 is a cross sectional view taken on a plane indicated by the line 4—4 in Fig. 2.
Figure 3:
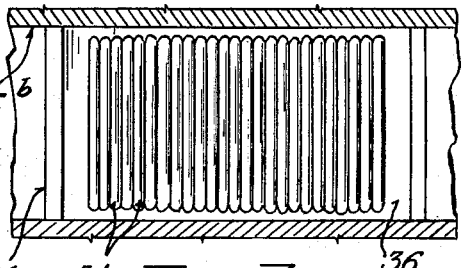
Fig. 3 is a cross sectional view taken on a plane indicated by the lines 3—3 in Figs. 1 and 2.

Referring particularly to Fig. 2, each torque transmitter includes a rugged radial portion 21a having cylindrical end walls complementary to and cooperating with the rigid cylindrical guide walls of an associated guide 17 in the torque flange 14, so as to guide the portion 21a therein against lateral displacement and provide the torque coupling between the barrel and portion 21a. The portion 21a has an undercut T-slot 21b which accommodates the piston head 19. The T-slot 21b has a load transmitting surface in engagement with the surface 20 of the piston head 19 and has shoulders in engagement with the inner face of the head 19 for guiding the piston and operating the piston on the suction stroke. Radially outwardly, beyond the flange 17, each torque transmitter 21 has a T-head portion 21c for cooperation with the piston actuating rotor for load and torque transmission, the portion 21c preferably being formed integral and rigid with the portion 21a. The portion 21c preferably is elongated fore and aft in the direction of rotation and also extends laterally so as to provide a rugged and large acting surface. Whether the portion 21c cooperates over its entire outer surface with the reactance surface, or cooperates with rollers in crosspins, the size and configuration of the portion is such that load transmission is as direct as possible.

For accommodating and cooperating with the torque transmitters 21 for reciprocating the associated pistons is a reactance rotor. The reactance rotor comprises a pair of coaxial generally annular reactance members 25, each having an axially extending hub portion 25a for accommodating the inner races of high speed antifriction balls 26. The outer races of the balls 26 are floatingly carried in an adjustable reactance stator 27, a part only of which is shown. The balls 26 of each set are received between their cooperating races with sufficient radial clearance to permit operation at the high speeds required. Each of the members 25 has an axially inset radial flange portion 25b, the flange portions providing a circumferentially extending recess 28 when the members 25 are assembled in coaxial relation. The recess 28 extends to the outer radial limits of the members 25 and accommodates the portions 21c of the torque transmitters with operating clearance. Each member 25 also has radially extending inner faces which lie snugly alongside the flange 14 of the barrel and the portions 21a of the torque transmitters to guide and fix axially the piston head and torque transmitter assembly.

At the base of each flange portion 25b are chordal shoulders 25c on which are mounted hardened plates 29 which provide the inner chordal operating faces of the reactance. The outer working faces of the reactance are provided by separate thrust blocks 30, each of which has a chordal face mating or substantially mating the outer working face of the head 21c and a cylindrical outer face coaxial with the members 25. The members 25 are formed with openings 25d, which extend parallel to the axis of rotation and receive bolts 32 for drawing the members 25 toward each other axially of the pump or motor.

In assembling the reactance rotor, the plates 29 are positioned on the chordal shoulders 25c of the member 25 and the blocks 30 are interposed between the members. The members 25 are then drawn up tightly against the blocks 30 by means of the bolts 32 so as to provide a substantially uniform structure. Preferably the blocks 29 are formed with bolt-receiving openings large enough to provide clearance recesses 31 about the bolts 32 so as to permit adjustment and alignment of the blocks 29 prior to tightening the bolts 32. Thus, the blocks 30 are clamped in operating position with their inner faces mating the outer working faces of the associated head portions 21c when the inner faces of the head portions 21c are in proper engagement with the surfaces of the plates 29. In this manner, a plurality of recesses accommodating the portions 21c for chordal oscillation while maintaining both load and torque transmitting co-action therewith are provided. The width of the plates 29 is accurately determined so that the radial faces of the members 25 and the flange portions 25b lie snugly alongside the aligned parts of the torque transmitters 21 with capillary operating clearance.

Figure 5:
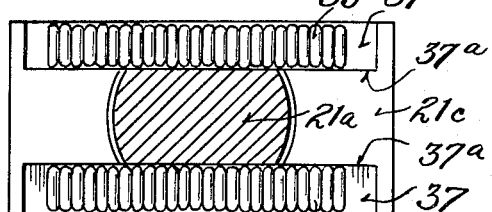
Fig. 5 is a cross sectional view taken on a plane indicated by the lines 5—5 in Figs. 1 and 2.

A rigid ring 33 is closely fitted over the outer circumferential edges of the flange portions 25b so that the recesses accommodating the blocks 30 and head portion 21c are sealed. The ring 33 is sufficiently rigid to receive and transmit load and reactance thrusts. Interposed between the working face of the blocks 30 and cooperating working face of the head portions 21c are elongated rollers 34 which are spaced a capillary distance from each other in the direction of oscillation of the head portion 21c. Correspondingly, elongated rollers 35 are interposed between the inner guide walls of the faces of the chordal guide surfaces of the plates 29 and corresponding working face of the head portions 21c. For accommodating the rollers, each head portion 21c is recessed on its outer surface, as indicated at 36, the recess terminating short of the length of the portion 21c, and the end walls of the recesses forming the constraining means for constraining the rollers therein. The inner face of the portions 21c are correspondingly provided with recesses 37, having roller guiding and retaining walls 37a, as best illustrated in Fig. 5.

It is apparent from the foregoing description that the axial spacing of the members 25 is determined by the blocks 30 and that the reactance assembly is completely sealed by the ring 33 so that a liquid tight chamber, in which the torque transmitters operate, is provided. The head portions 21c of the torque transmitters thus may operate as T-heads with the additional advantage, however, that their alignment with the pistons during their oscillation with respect to the reactance rotor is maintained without stressing or transmitting any torque stresses to the pistons, all torque stresses from the T-heads being resisted by the rugged radial portions 21a and flange guides. Again, the load reactance surface of the block 30 is co-extensive laterally with the head portion 21c so that full area anti-friction load and torque transmission is effected.

Figure 6:
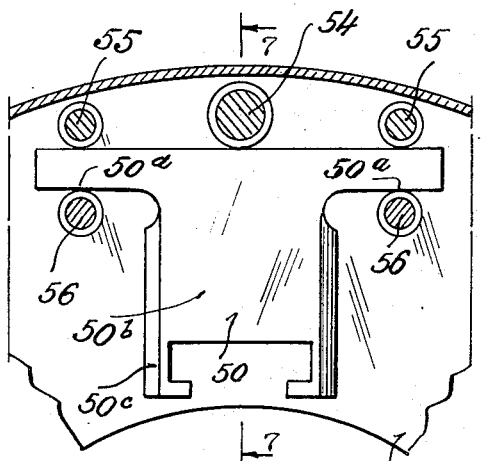
Fig. 6 is a fragmentary view of a rotary reactance and associated torque member illustrating a modification of the mounting thereof and is taken on a plane indicated by the line 6—6 in Fig. 7.
Figure 7:
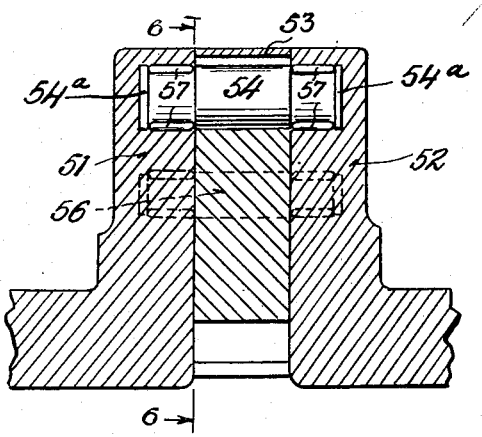
Fig. 7 is a sectional view taken on a plane indicated by the line 7—7 in Fig. 6.

In Figs. 6 and 7 a torque transmitter similar to the transmitter 21 but in rolling co-action with the reactance is illustrated. In this modification a torque transmitter 50 has a head portion 50a and radial portion 50b, the radial portion having a recess at one end to accommodate the piston head as heretofore described. The radial portion also has cylindrical end walls 50c for cooperation with corresponding walls in the radial guideways in the barrel flange. The reactance rotor comprises a pair of mated rings having radial flanges 51 and 52 respectively, the rings being spaced apart by a suitable spacer 53. Aligned bores are provided in the rings 51 and 52 for accommodating the end portions of a main load roller 54 and outer and inner torque transmitting rollers 55 and 56 respectively.

As more fully described in my copending applications, Ser. No. 738,184, filed August 3, 1934, Patent No. 2,129,642 and Ser. No. 13,294, filed March 27, 1935, Patent No. 2,097,830, the central or load roller 54 applies the reactance load to the torque transmitter as it oscillates to and fro tangentially relative to the reactance. Torque is transmitted through the medium of one roller 55 and a roller 56 at the opposite side of the radial axis of the torque transmitter from the particular coacting roller 55, the specific roller 55 and cooperating roller 56 acting at any particular period being dependent upon the direction of rotation of the pump or motor. This action is effected by a slight warping of the head portion 50a during torque transmission to the portion 50. For example, the head portion 50a may engage the left hand roller 55 and right hand roller 56 concurrently for transmitting the torque while the load is applied by the roller 54.

In order to assure anti-friction torque transmission and a rolling engagement between the rollers and portion 50a, each of the rollers is mounted in full complement rollers such as 57, better illustrated in connection with the roller 54 in Fig. 7. For accommodating the rollers 57, each of the rollers 54, 55 and 56 has recesses adjacent the ends forming reducing diameter bearing races in which the rollers 57 operate, the rollers being constrained to proper axial position within the races by the end shoulder 54a and shoulder formed between the recesses and the larger diameter central portion of the rollers.

In this structure also, since the spacing ring 53 is clamped tightly between the flanges 51 and 52, a circumferential liquid tight pocket is formed for maintaining all of the working parts immersed in slip fluid. Thus the torque transmitters are accurately guided and operate on high pressure combination oil and mechanical bearings, torque stresses being segregated from the pistons by the radial portion 50b and thus transferred directly to the barrel flange.

In each of the above structures the torque transmitters have been described as associated with a rotary radial piston pump having a surrounding reactance rotor, but it is apparent that they may be used in connection with pumps or motors wherein the cylinders are carried on the outer rotor or where the cylinders themselves are the reciprocated members, the cooperation of the torque transmitters and associated reactance being the same in either instance.

I claim:

1. In a rotary radial piston pump or motor including a plurality of radial piston and cylinder assemblies, valve means therefor, means mounting the piston and cylinder assemblies for rotation about a given axis, a reactance guide means for the pistons comprising spaced parallel members having radial flange walls respectively disposed at opposite sides of and close to the plane of the pistons and defining a circumferential recess and having radial flange portions axially offset outwardly therefrom, and chordal shoulders between the radial walls and radial flange portions, head portions on the pistons respectively and received in the recess, torque transmitters connected to the head portions of the pistons respectively and having their inner faces on said chordal shoulders for oscillation therealong, reactance blocks each having a face coacting with the outer working face of the torque transmitter of an associated piston, said block being disposed between the radial flange portions of the reactance guide members and spacing the same apart axially, means for drawing the guide members firmly against the lateral faces of said block in clamping engagement therewith, and a load resisting member surrounding and fixed to the circumferential edges of the reactance guide means and abutting the block.

2. In a rotary radial piston pump or motor, a rotary cylinder barrel having a plurality of radial cylinders, pistons reciprocable therein, valve means for the cylinders, radial guideways on the barrel aligned respectively with the cylinders, a rotary reactance in surrounding relation to the barrel and eccentric thereto and having radial walls disposed at opposite sides of the plane of the pistons, and torque members operatively connecting the barrel and reactance for torque transmission and connected to the pistons for actuating the same upon concurrent rotation of the rotors, each torque member comprising a radial load transmitting portion reciprocable in and guided by said guideways for transmitting torque and load and connected at its inner end to an associated piston, and a chordal head portion on the outer end of the radial portion and rigid therewith and disposed between said radial walls of the reactance rotor and coacting with the rotary reactance entirely across the projected end area of the associated piston for load transmission, the chordal head portion being mounted for oscillation along the projected area of the associated piston to compensate for tangential components of eccentricity of the rotor and barrel.

3. In a rotary radial piston pump or motor, a cylinder barrel having a plurality of radial cylinders, valve means for the cylinders, pistons reciprocable therein, a radial flange on the barrel in the zone of the cylinders, said flange having a plurality of radial guideways aligned respectively with the cylinders, a rotary reactance in surrounding relation to the barrel, radial load transmitting members reciprocable in and guided by said guideways respectively, means connecting the radial load members and rotary reactance for torque and load transmission, an undercut recess in the inner end of each radial load member providing a load transmitting end wall and shoulders spaced therefrom, heads on the pistons respectively, each head being accommodated in the recess of the associated load member and having reactance surfaces coacting respectively with the end wall and shoulders thereof.

4. In a pump or motor of the character described, a rotatable barrel, piston and cylinder assemblies carried thereby, valve means for the assemblies, rotatable reactance means eccentric to the barrel and connected to the assemblies for actuating the assemblies, said reactance means comprising a pair of ring members spaced at opposite sides of the assemblies, each ring member being provided with a plurality of circumferential segments arranged in end-to-end spaced relation and having outwardly facing reactance surfaces cooperable with the assemblies respectively, the segments of one ring member being aligned with segments of the other ring member respectively, bolts extending parallel to the ring axis, each bolt passing between two adjacent segments and serving to draw said ring members towards each other, blocks disposed between and spacing apart said ring members and having inwardly facing reactance surfaces cooperable with the assemblies respectively, and a retaining ring fitting onto and surrounding said ring members and bridging the space therebetween and buttressing the blocks.

ELEK K. BENEDEK.